Sept. 16, 1958     E. J. WADE     2,852,456
NEUTRONIC REACTOR

Filed Nov. 17, 1953     9 Sheets-Sheet 1

INVENTOR.
Elmer J. Wade
BY
Roland A. Anderson
Attorney

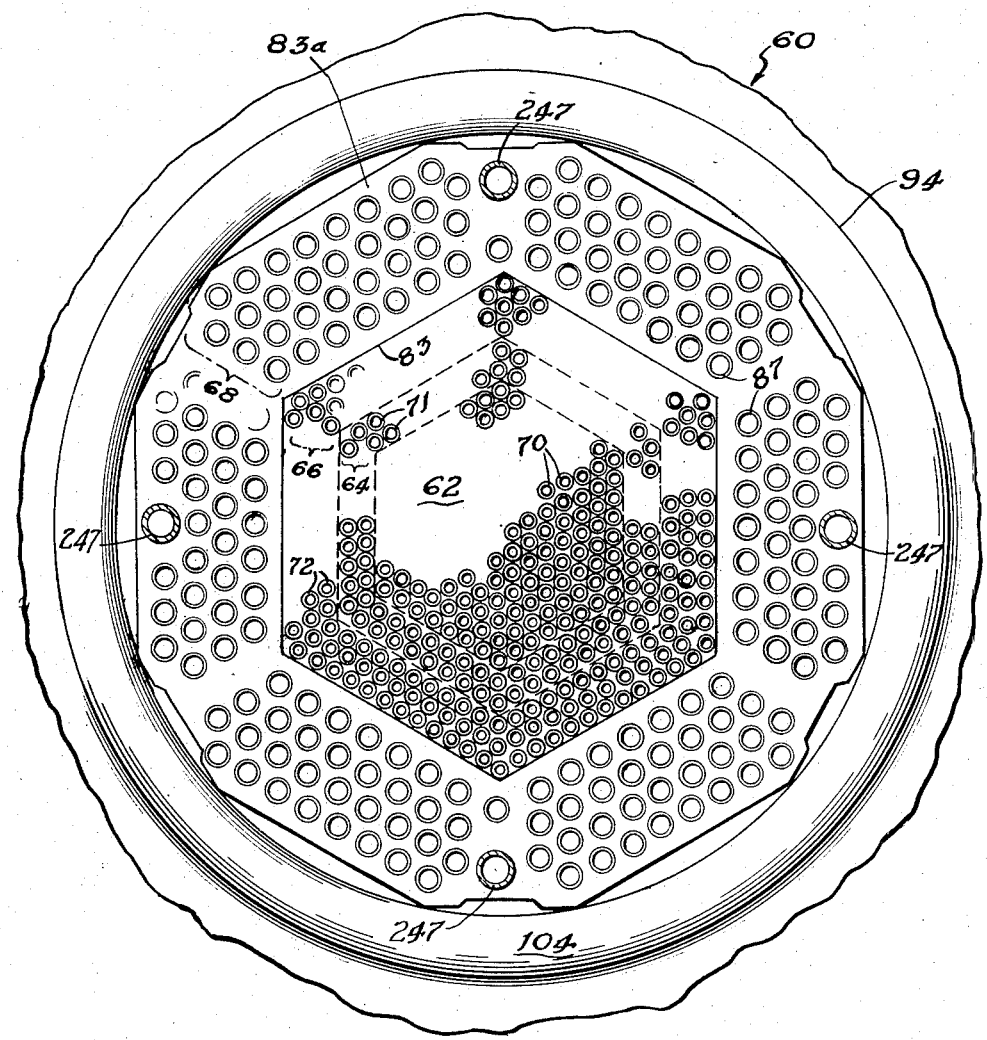

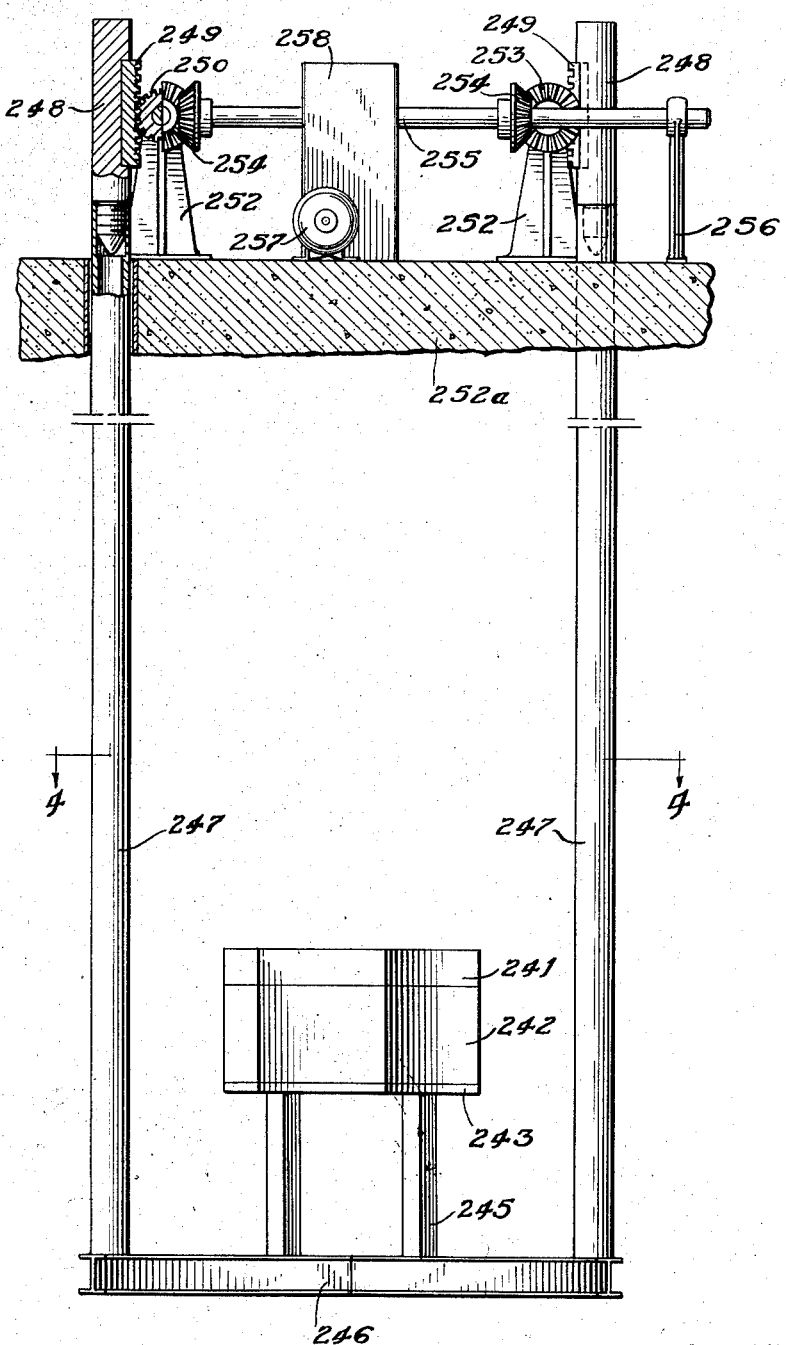

Sept. 16, 1958  E. J. WADE  2,852,456
NEUTRONIC REACTOR
Filed Nov. 17, 1953  9 Sheets-Sheet 4

INVENTOR.
Elmer J. Wade
BY
Roland A. Anderson
ATTORNEY

Sept. 16, 1958     E. J. WADE     2,852,456
NEUTRONIC REACTOR
Filed Nov. 17, 1953     9 Sheets-Sheet 5
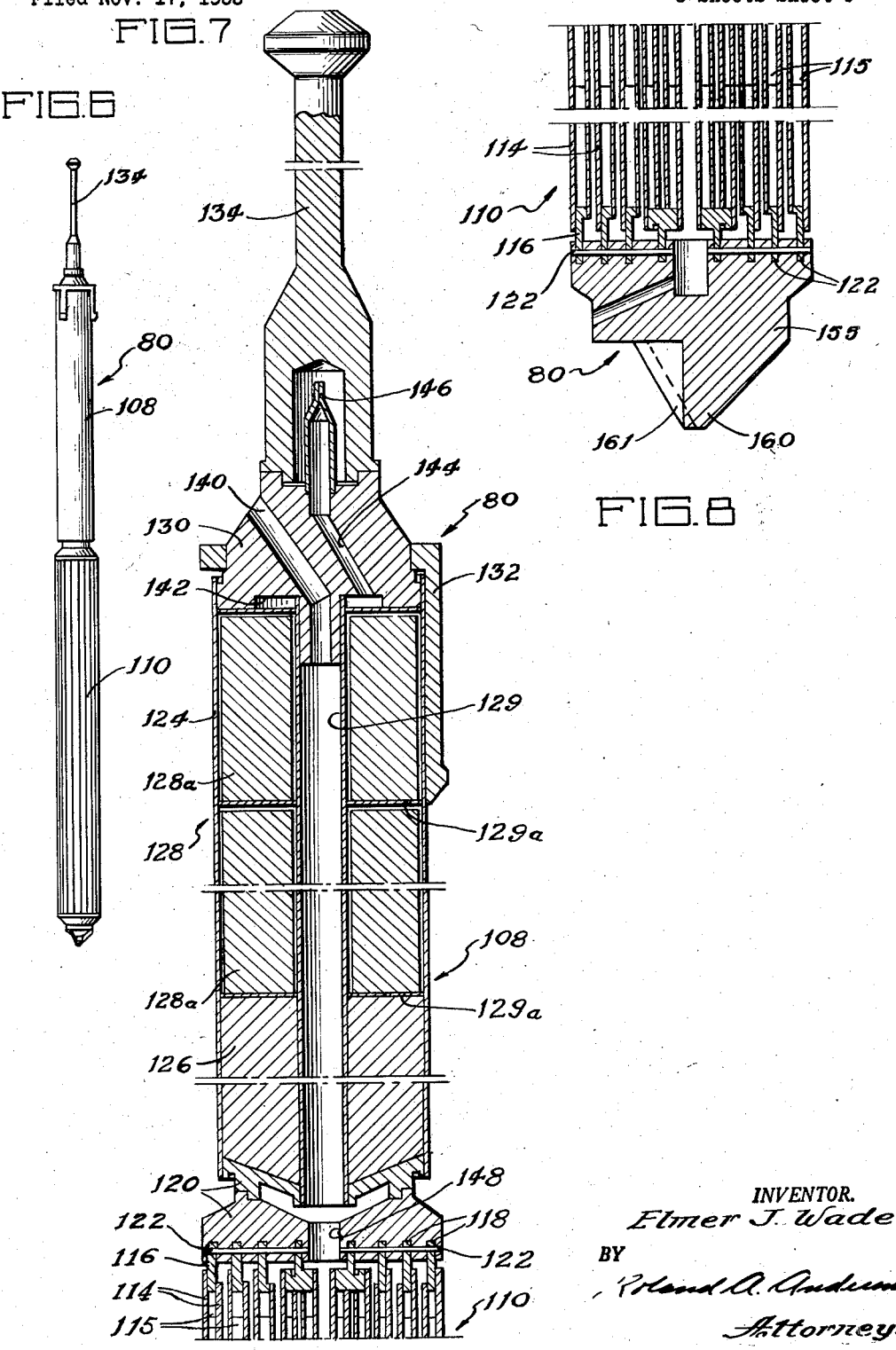

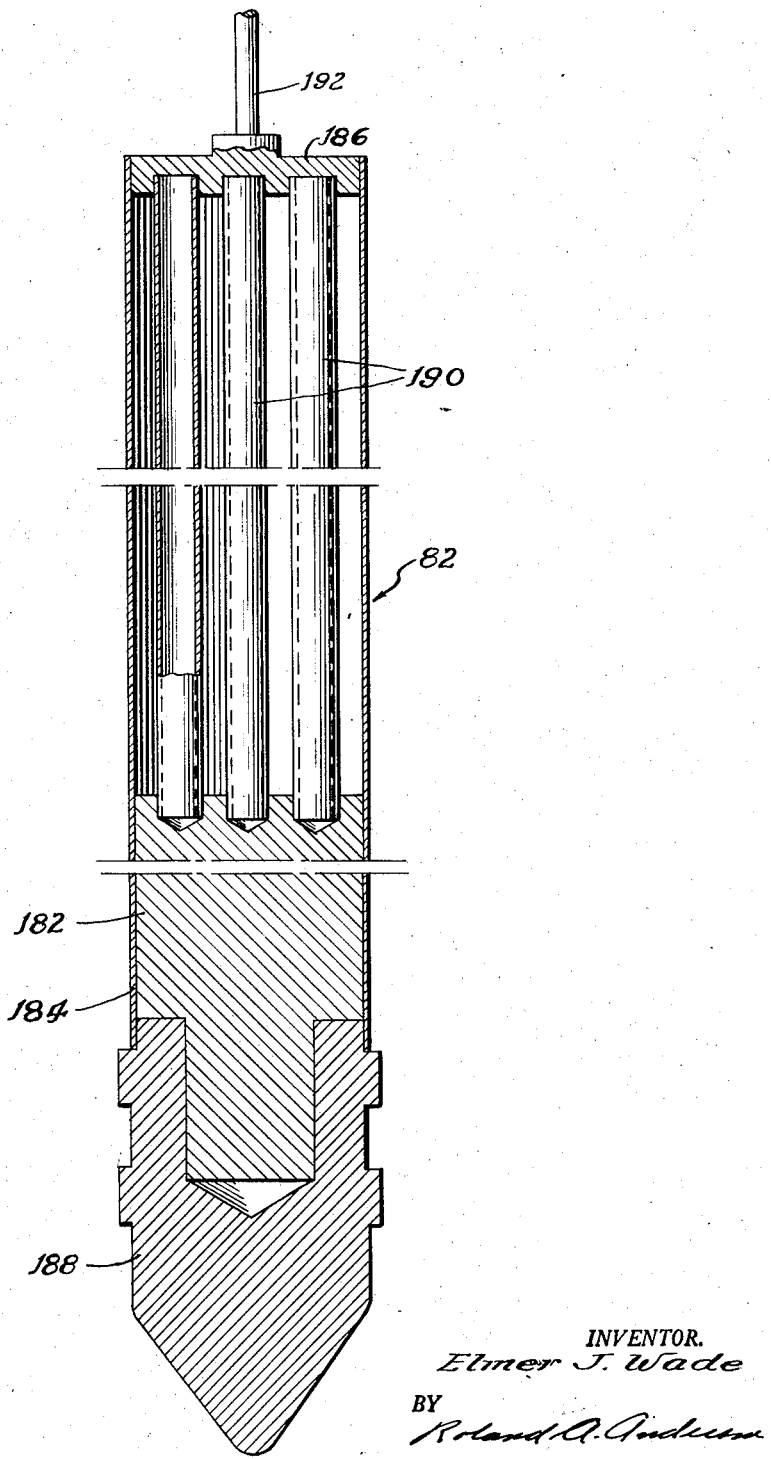

Sept. 16, 1958      E. J. WADE      2,852,456
NEUTRONIC REACTOR
Filed Nov. 17, 1953      9 Sheets-Sheet 7
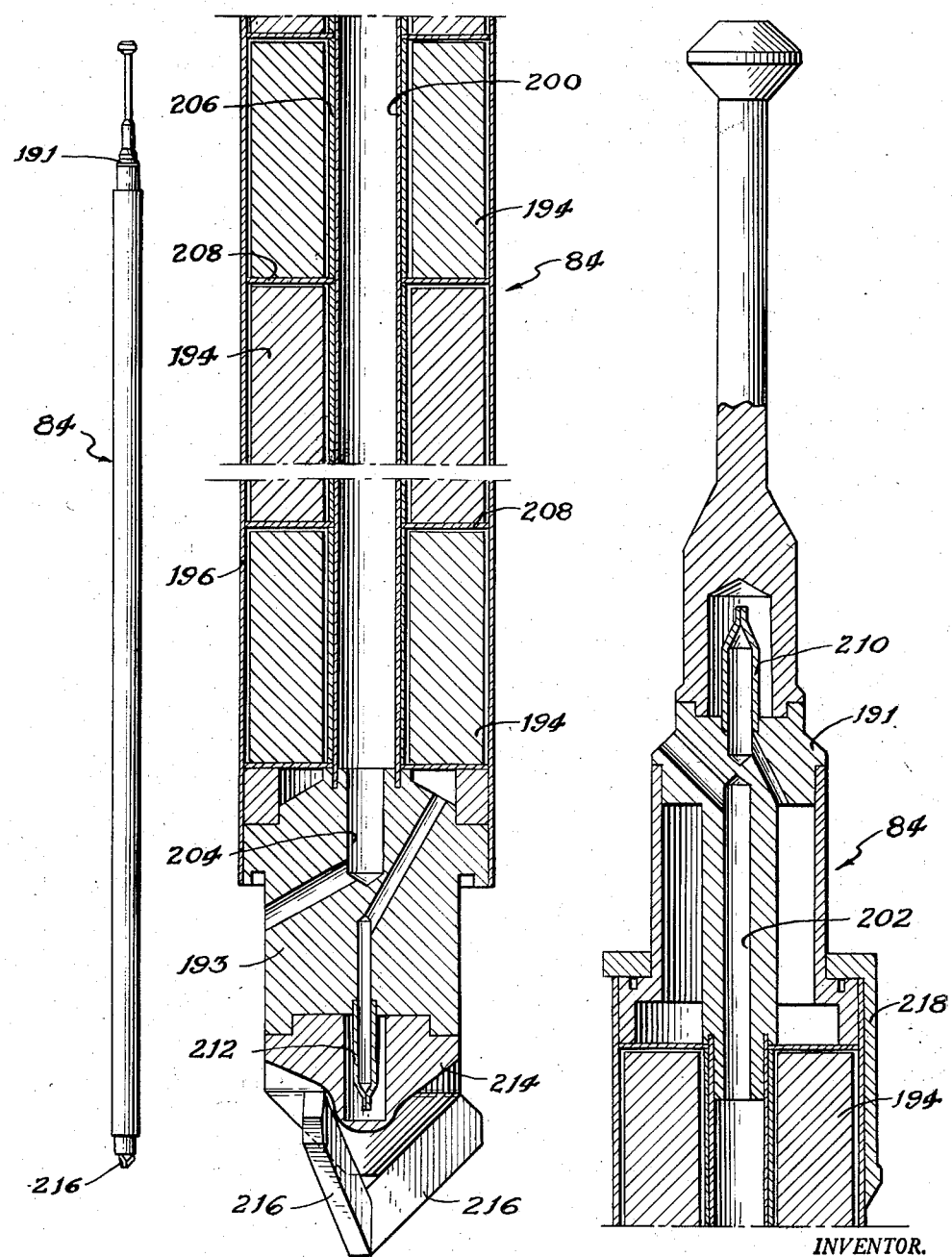
INVENTOR.
Elmer J. Wade
BY
Roland A. Anderson
Attorney

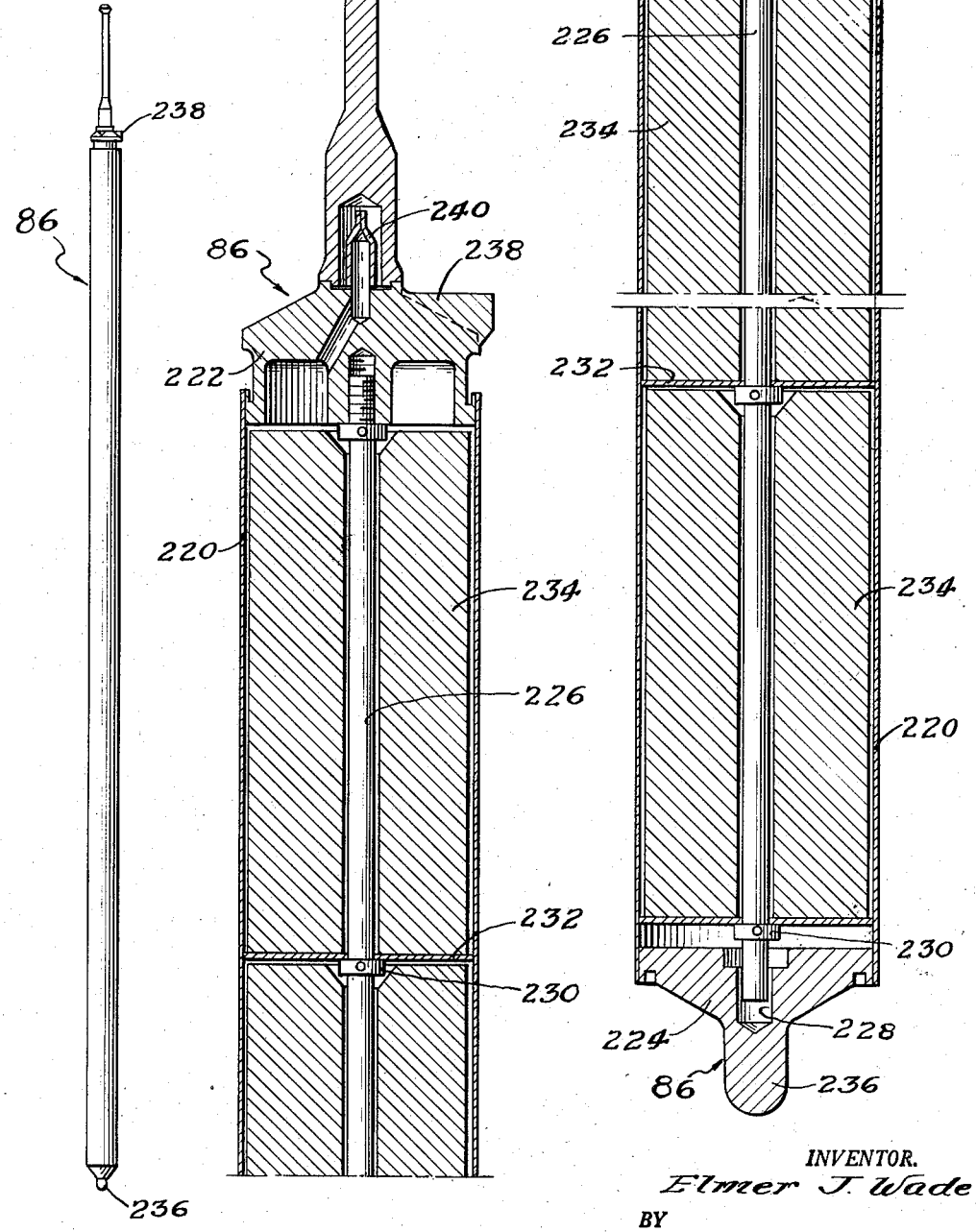

Sept. 16, 1958 E. J. WADE 2,852,456
NEUTRONIC REACTOR
Filed Nov. 17, 1953 9 Sheets-Sheet 9
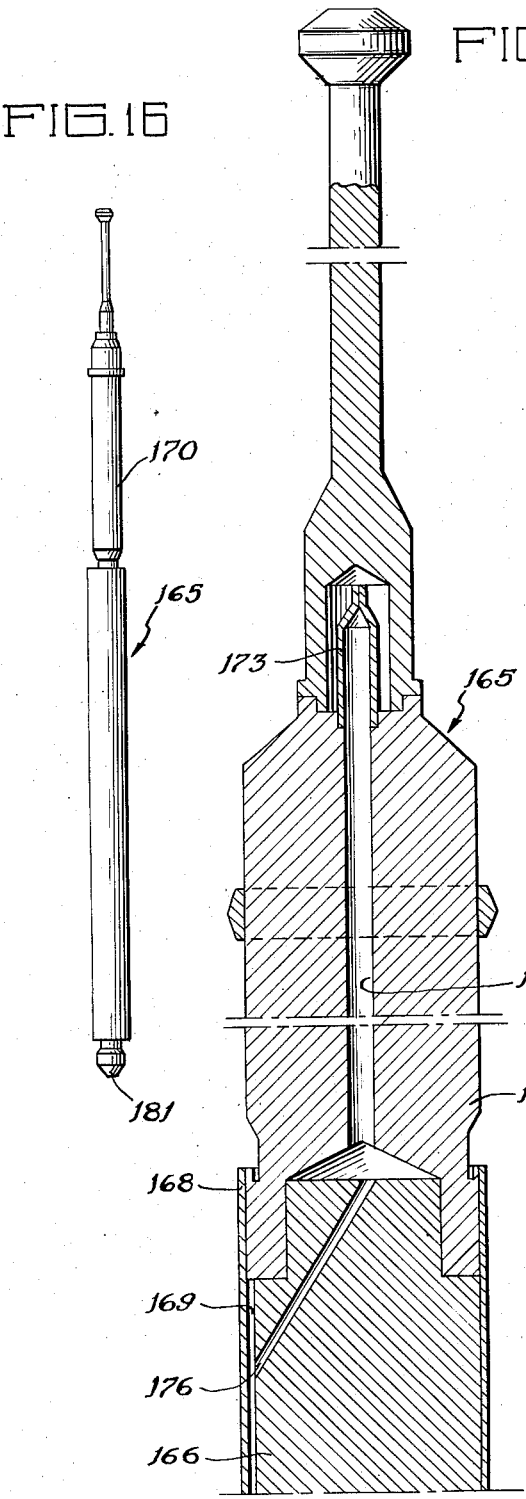
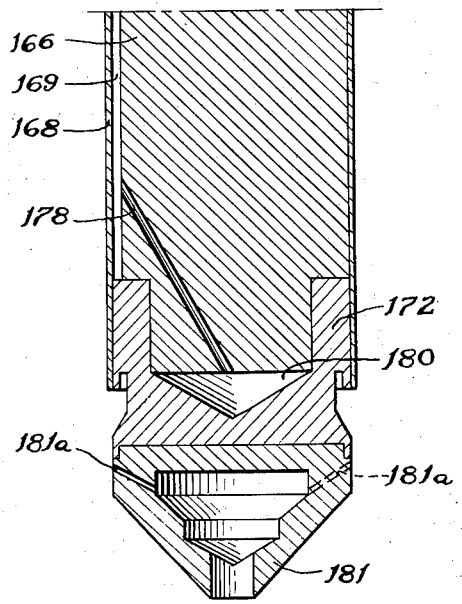
INVENTOR.
Elmer J. Wade
BY
Roland A. Anderson
Attorney

United States Patent Office 2,852,456
Patented Sept. 16, 1958

2,852,456

NEUTRONIC REACTOR

Elmer J. Wade, Scotia, N. Y., assignor to the United States of America as represented by the United States Atomic Energy Commission Application November 17, 1953, Serial No. 392,783

4 Claims. (Cl. 204—193.2)

This invention relates to a neutronic reactor and more particularly to a reflector in the reactor.

It is known to control the reactivity of a neutronic reactor by the shifting of neutron-absorbing rods into and out of the reactor. When excessive reactivity occurs, there will also be very high temperatures that may create distortion in the reactor, which could interfere with prompt movement of the absorbing members into absorbing proximity to the reactor. Thus some safety arrangement becomes highly desirable which will decrease reactivity in the event of jamming of the controls.

According to the present invention, such safety arrangement takes the form of a reflector and its support by which movement of the reflector with respect to the core of the reactor may be made to take place rapidly and certainly without the likelihood of interference due to high temperatures produced by excessive reactivity.

In the drawings:

Fig. 2 is a plan view of the reactor;

Fig. 3 is an elevation, partly in section, of the movable bottom reflector and the means for supporting and moving the same;

Fig. 6 is an elevation of a fuel rod employed in the neutronic reactor;

Figs. 7 and 8 are adapted to be placed end to end to constitute a complete vertical sectional view of the fuel rod;

Fig. 9 is a vertical sectional view of a control rod employed in the reactor;

Fig. 10 is an elevation of a fast neutron absorber rod employed in the reactor;

Figs. 11 and 12 are adapted to be placed end to end so as to constitute a complete vertical sectional view of the fast neutron absorber rod;

Fig. 13 is an elevation of a slow neutron absorber rod employed in the reactor;

Figs. 14 and 15 are adapted to be placed end to end so as to constitute a complete vertical sectional view of the slow neutron absorber rod;

Fig. 16 is an elevation of a moderating rod used for the reactor; and

Figs. 17 and 18 are adapted to be placed end to end so as to constitute a complete vertical sectional view of the moderating rod.

Figure 1:
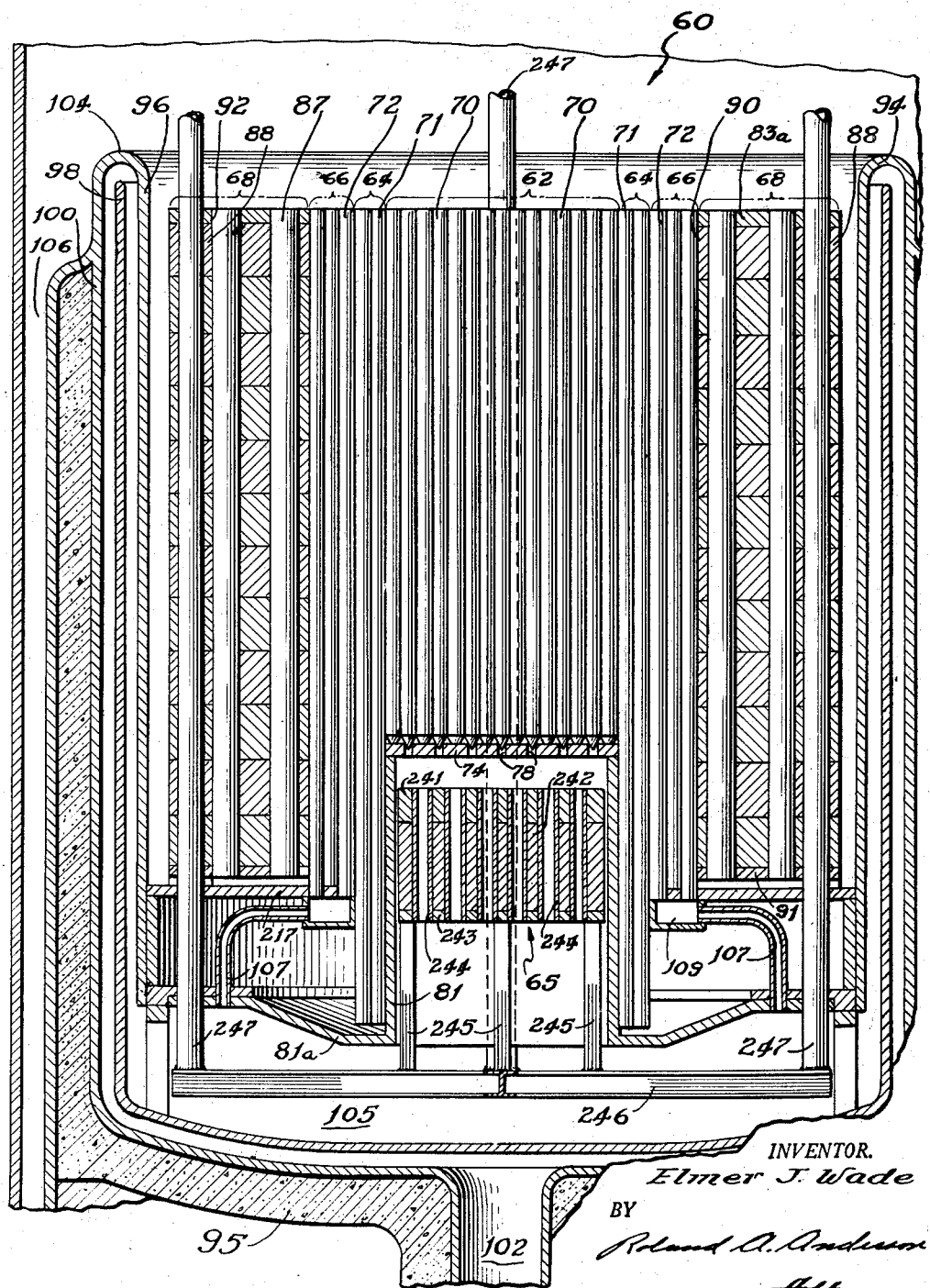
Fig. 1 is a vertical sectional view of a neutronic reactor to which the novel movable bottom reflector of the present invention is applied.

A neutronic reactor 60 is shown in Figs. 1 and 2. It comprises a core 62, a stationary side reflector 64, a movable bottom reflector 65, a region 66 for moderating and absorbing neutrons, hereinafter called a fast region, and a region 68 for further moderating neutrons and absorbing such moderated neutrons, hereinafter called a slow region. The novelty in the present invention resides in the mounting and provision for adjustment of the bottom reflector 65. This novelty will be set forth in detail at another place in the specification. As shown in Figs. 1 and 2, the core 62 is centrally disposed in the reactor 60 and is a right hexagonal prism that is 18 inches across. It is responsible for 77% of the total power generation while the remainder of the power generation occurs in the fast and slow regions 66 and 68. The regions occupied by the core 62, the reflector 64, and the fast regions 66 are occupied by matrices of thin-walled tubes 70, 71, and 72, respectively, in a honeycomb arrangement, which tubes are preferably made of stainless steel. The lower extremities of the tubes 70 within the core 62 fit snugly into apertures 78 in the support plate 74. Each tube 70 within the core 62 serves as a housing for a fuel rod 80 shown in Fig. 6 and to be described hereinafter. The lower support plate 74 is carried by a central cylindrical flange 81 formed on a lower support member 81a.

For purposes of illustration, as shown in Fig. 2, two concentric dotted lines are used to encompass hexagonal areas the centers of which are located in the plane of the drawing at the center of the core 62. Centrally disposed is the hexagonal area encompassed by the innermost dotted line. This area corresponds to the hexagonal core 62 which includes 169 matrix tubes 70. Completely surrounding the core 62 is the reflector 64 that is included between the dotted lines. The reflector region 64 consists of 102 matrix tubes 71 disposed in two concentric rows, each tube being adapted to house a control rod 82 as shown in Fig. 9 and to be described with particularity hereinbelow. Referring to Fig. 1, it is pointed out that the control rods 82 are considerably longer than the fuel rods 80 within the core 62 for which reason the control rods 82 extend below the support plate 74. Returning to Fig. 2, the reflector region 64 is surrounded by the fast region 66 included between the outer dotted line and a hexagonal opening 83 in a top plate 83a. This region is provided with 198 matrix tubes 72 disposed in three concentric rows, each of which tubes is adapted to house a rod 84 for absorbing fast neutrons, hereinafter called fast rods, as shown in Fig. 10 and to be described with particularity hereinafter. In addition the slow regions 68 surrounds the fast region 66 and has 270 rods 86 for absorbing neutrons of slow or thermal energy, hereinafter called slow rods, shown in Fig. 13 and to be described with particularity hereinafter. The slow rods 86 are housed in liner tubes 87 formed of stainless steel.

It is evident from the foregoing that the neutron-absorber region is subdivided into the fast region 66 and the slow region 68, in the latter of which the power generation is relatively small. The fast region 66 is distinguishable from the slow region 68 in that the former is contained in the matrix tubes 72 and forms a part of the same honeycomb as the core 62 and reflector 64. The interstices between the tubes 70, 71, and 72 are filled with moderator material (not shown), such as beryllium. At both ends of all interstices, stubs of stainless steel are welded into place but do not seal the interstices, and the stagnant sodium in them provides good heat transfer. Surrounding this unit is the slow region 68. As shown in Fig. 1, it comprises laminated slabs 88 of neutron-moderating material, such as beryllium or carbon. Each slab 88 is approximately 2 inches thick and is provided with a hexagonal opening 90. The slabs 88 are stacked upon a support plate 91 in such a manner that the hexagonal openings register with each other and the aperture 83 in the top plate 83a, thereby providing a housing for the matrix tubes 70, 71, and 72 of the core 62, the reflector 64, and the fast region 66. The thickness of the reflector 64 is about 2½ inches while that of the fast region 66 and the slow region 68 are 4 and 12 inches, respectively. The slow region 68 contains equal parts by volume of fertile or neutron-absorbing material, such as natural uranium or Th$^{232}$, and moderating material, such as beryllium, together with some liquid sodium or alloy of sodium and potassium for cooling purposes to be described below. The slabs 88 and the top plate 83a contain a plurality of apertures 92 in which the liner tubes 87 for the slow rods 86 are positioned. By virtue of the foregoing construction between 85 and 90% of the neutrons escaping from the core 62 are captured in the fast and slow regions 66 and 68.

At this point it should be indicated that the horizontal cross sections of the core 62, the reflector 64, and the fast and slow regions 66 and 68 have been disclosed as hexagonal. In addition the various rods 82, 84, and 86 will be disclosed as being round. Throughout the specification other parts will be described as having either rectangular, square, hexagonal, or other like shapes; however, it is not intended that the invention be limited to the particular shape disclosed, because manifestly a different cross section will be satisfactory.

As shown in Fig. 1 the reactor 60 is contained within a vessel 94 that is supported upon steel-reinforced concrete 95 in a conventional manner. The vessel 94 is constructed of three spaced annular partitions 96, 98, and 100. The partition 98 is disposed between the inner partition 96 and the outer partition 100. Both partitions 98 and 100 are U-shaped with the latter having a coolant inlet 102 centrally disposed at the lowermost point thereof. Further, the partition 96 is shown as being integral with the partition 100, there being a shoulder 104 formed at the upper extremities thereof. By means of this construction a liquid coolant (not shown in the drawings) which is preferably liquid sodium, but may be other liquids, such as an alloy of sodium and potassium, may be caused to enter the coolant inlet 102 and ascend between the partitions 98 and 100 to the shoulder 104 from which point the liquid descends between the partitions 96 and 98 to a plenum chamber 105 beneath the lower support member 81a of the reactor 60. From this point the coolant then rises into the matrix tubes 70 of the core 62 through the apertures 78 in the support plate 74. After passing through the top of the matrix tubes 70 the coolant then passes over the shoulder 104 from which point it is directed to a coolant outlet 106. The coolant is then directed through a heat exchanger (not shown) from which it returns to the reactor 60 via the inlet 102. As the coolant rises through the matrix tubes 70 in the core 62, it passes not only between said tubes and the fuel rods 80 disposed therein, but also into and through said rods. Coolant passes through pipes 107 into a plenum chamber 109 and up through tubes 71. Further, the coolant also passes downwardly into the matrix tubes 71 and 87 in the reflector 64 and slow region 68 of the reactor 60. The rods 82, 84, and 86 are designed with slightly less diameters than the tubes in which they are disposed. The coolant also passes into the space between the beryllium slabs 88 and the partition 96, and, in order to prevent erosion of the beryllium by the coolant, all surfaces of the beryllium including the apertures 92, in contact with coolant are clad with thin layers of stainless steel. By permitting the coolant liquid to seep into and fill all spaces within the reactor wherever feasible, a more satisfactory heat control system is achieved due to good thermal conductivity.

Attention is now directed to the fuel rod 80 as shown in Figs. 6, 7, and 8. The fuel rod 80 is an elongated unit having top and bottom portions designated as 108 and 110, respectively. At the bottom portion 110 the rod 80 has its largest diameter of approximately 1.25 inches which is accommodated by the 1.353 inches internal diameter of the matrix tube 70. The bottom portion 110 comprises a vertical bundle of 97 cartridges 114 of material resistant to corrosion by the coolant and nonfissionable by thermal neutrons, such as stainless steel tubing. The cartridges 114 are disposed in five concentric circles having 32, 26, 21, 12, and 6 tubes, respectively. As shown in Figs. 7 and 8 the extremities of each cartridge 114 in a given circle are mounted in a liquid-tight manner to a circular band 116, one of which is disposed concentrically at the end of each circle of cartridges for the purpose of containing each cartridge within its predesigned orbit. For purposes of fabrication the two smaller orbits of cartridges 114 are mounted at corresponding ends to the same band 116. In turn, the four bands 116 at the top end of the cartridges 114 are inserted into concentric slots 118 in a connector 120 where they are held in place by a pin 122. The connector 120 joins the cartridges 114 composing the bottom portion 110 to the top portion 108.

Within each cartridge 114 nine capsule fuel elements 115 are inserted in end-to-end relationship. Each fuel element 115 is 2 inches long and comprises an elongated cylindrical jacket and a body of fissionable material partially filling the jacket. Suitable materials for the jacket are vanadium, titanium, zirconium, molybdenum, and stainless steel. The jacket has an inside diameter of 0.060 inch and a wall thickness of 0.010 inch. The body of fissionable material contains an isotope fissionable by neutrons of thermal energy, such as U$^{233}$, U$^{235}$, and Pu$^{239}$. The portion of the jacket not filled by the fissionable body is a void or is occupied by a filler of heat-conducting material, such as sodium or alloy of sodium and potassium or an inert gas such as helium, at a one-atmosphere pressure. The fissionable body and any filler are hermetically sealed in the jacket. The capsule fuel elements 115 are more fully disclosed and claimed in the copending application of Charles R. Stahl, Serial No. 321,076, filed November 18, 1952.

Since there is clearance of about 0.002 inch between each capsule 115 and the interior surface of the cartridge 114, good thermal conductivity between the parts may be obtained by either filling the clearance space with sodium or an alloy of sodium and potassium or by passing the assembly through a die in order to reduce the inside diameter of the cartridge into contact with the capsule 115.

The top portion 108 of the fuel rod 80 consists of a cylindrical jacket 124 of noncorrosive, nonfissionable material, such as stainless steel, which serves as a housing for a body 126 of neutron-reflector material, such as beryllium, and for a body 128 of neutron-absorbing material, such as natural uranium or Th$^{232}$. Both bodies 126 and 128 are annular, the former being disposed at the lower end of the top portion 108 nearest the connector 120. Above the reflector body 126 is the absorbing body 128, which is composed of ten natural uranium hollow cylinders 128a, 1.101 inches O. D. by 0.354 inch I. D. by 1.012 inches high. The beryllium reflector body 126 is 3 inches long by 1.136 inches diameter with a 0.354 inch diameter hole up the center of the beryllium piece. The cylinders are supported by a stainless steel and titanium assembly that allows 0.040 inch clearance on both diameters and a 0.02 inch clearance on height. This assembly comprises the outer jacket 124, an inner cylindrical jacket 129 of stainless steel, and titanium washers 129a. Secured to the top of the fuel rod 80 is a cap 130 of noncorrosive, nonfissionable material to which is secured the upper end of the cylindrical jacket 124 in a fluid-tight manner. A rod guide 132 is attached to the cap 130 for the purpose of spacing the top of the rod 80 in a central position within the surrounding matrix tube 70. Surmounting the fuel rod 80 is a lifting lug 134 which extends above the surface of the cover plate 83a when the rod 80 is disposed in the core 62.

At its upper end the inner jacket 129 communicates with a passage 140 in the cap 130 which passage communicates with the upper extremity of the fuel rod 80. Surrounding the passage 140 and in the lower surface of the cap 130 is an annular channel 142 which communicates with a passage 144 extending from the center of the top surface of said cap where it terminates into a pinch-off tube 146. In order to secure good thermal conductivity between the adjacent parts, sodium is applied to the tube 146 and runs through the passage 144, the channel 142, and openings (not shown) in the washers 129a, filling the spaces between the absorbing cylinders 128a and the jackets 124 and 129 and the washers 129a. Then the tube 146 is pinched shut. The lower end of the inner jacket 129 communicates with the space between the top portion 108 and the bottom portion 110, which space is sustained by the tripod connection between said portions. In addition, a central aperture 148 in the connector 120 is aligned with the jacket 129 and communicates with the space between the cartridges 114 in the bottom portion 110 of the fuel element 80. Due to the foregoing construction features it is possible for the liquid coolant as it rises through the matrix tube 70 to flow between the cartridges 114 and also to flow through the aperture 148 and the inner jacket 129 to the top of the fuel element 80 via the passage 140. Accordingly, not only the exterior of the fuel element 80 is in contact with the coolant, but also the interior parts.

Referring now to Fig. 8, it will be seen that the lower end of the bottom portion 110 is associated with a lower connector 155 in the same manner as is the upper end with the upper connector 120. The connector 155 has a tapered tip 160 provided with three ribs 161 whereby the tip may be inserted into aperture 78 in the support plate 74 without blocking the flow of a liquid coolant through said aperture as shown in Fig. 1.

In order to allow flexibility for experiments, for unforeseen nuclear phenomena, and for changes in reactivity with the variable spectrum, it is desirable to have a number of dummy rods having a minimum of structural material, which are used instead of certain fuel rods 80. Such dummy rods, except for a difference in length, are completely disclosed in the copending application of Charles R. Stahl, Serial No. 321,076, filed November 18, 1952.

To achieve the flexibility of neutron spectrum that is desired, a moderating rod 165, shown in Figs. 16, 17, and 18, of the same size as a fuel rod is used. By substitution of the moderating rods 165 for fuel rods the spectrum may be changed from fast to intermediate with little change in reactivity. In order to achieve equivalence, these rods must contain a maximum amount of beryllium.

Like the fuel rod 80 the moderator rod 165 is divided into two portions having approximately the same exterior diameters. The primary difference in the moderating rod 165 is its bottom portion comprising an elongated shaft 166 of neutron-moderating material, such as beryllium, 22 inches long. A jacket 168 of slightly larger diameter surrounds the shaft 166, creating a clearance 169 therebetween. The jacket 168 is composed of noncorrosive material, such as stainless steel. As shown in Figs. 17 and 18, the upper and lower extremities of the encased shaft are secured to end members 170 and 172, respectively, in a fluid-tight manner. End member 170 is made of soft iron and is 10 inches long. The end member 170 at the top of the rod 165 is provided with a central bore 174 which communicates with a pinch-off tube 173 at the top and with a passage 176 extending diagonally across the upper corner of the shaft 166 to communicate with the clearance 169. In turn the clearance 169 communicates with a diagonal passage 178 across the lower end of the shaft 166, which connects with a space 180 between the shaft and the lower end member 172. The foregoing passages and bore are filled with the liquid coolant, such as sodium-potassium alloy, and sealed therein by means of the pinch-off tube 173. A conical tip 181 is attached to the end member 172. Inclined radial passages 181a are provided between the member 172 and tip 181 for the flow of coolant. The member 172 and tip 181 may be of stainless steel.

It was pointed out above that the core region 62 is surrounded by the reflector 64 having an effective thickness of approximately 2½ inches in which 102 control rods 82 are housed in two adjacent rows of matrix tubes 71, as shown in Fig. 2. The control rod 82, shown in Fig. 9, has in its lower portion a body 182, 23 inches long and 1.25 inches in diameter, of neutron-moderating material, such as beryllium, encased in a jacket 184 of stainless steel. The upper and lower ends of the jacket are closed in a fluid-tight manner to end bodies 186 and 188, respectively. In the upper portion of the rod 82 a number of vertical tubes 190, 12 inches long, are mounted having their upper ends sealed within the upper end body 186 and their lower ends sealed within the top of the beryllium body 182. The tubes 190 contain empty compartmented voids. To the top of the rod 82 is attached an elongated shaft 192 so that the rods 82 may be raised. They may be lowered so the beryllium body is entirely below the level of bottom portion 110 of fuel rod 80. In this manner the beryllium reflector is replaced by void, when necessary, to shut down or control the reactor. The inner diameter of the matrix tubes 71, in which the control rods 82 are positioned, is 1.365 inches.

As was set forth above with regard to Figs. 1 and 2, the reflector region 64 is surrounded by the fast region 66 which is about 4 inches thick and has 198 matrix tubes 72 disposed in three rows. One fast rod 84, shown in Figs. 10, 11, and 12, is disposed in each of the above 198 matrix tubes 72. The outside dimensions of these rods are 54.625 inches long and 1.225 inches in diameter. The inside diameter of the matrix tubes 72 is 1.365 inches, whereby an annular clearance of 0.070 inch is provided for the passage of a liquid coolant and for easy insertion and withdrawal of rod 84. With the exception of the top and bottom end members 191 and 193, the rod 84 consists of a plurality of stacked annular bodies 194 of neutron-absorbing material, such as natural uranium, extending between the end members and encased within a cylindrical jacket 196 of stainless steel, the upper and lower ends of which are secured to the end members in a fluid-tight manner. It is preferred that there be 38 bodies 194 each having a height of 1.15 inches and inside diameter of 0.352 inch and an outside diameter of 1.157 inches with 0.014 inch thick jackets of stainless steel.

As shown in Figs. 11 and 12, the rod 84 contains a central coolant tube 200 having an internal diameter of 0.265 inch and being formed of noncorrosive material, such as stainless steel, the upper and lower ends of the coolant tube being attached to the top and bottom end members 191 and 193, respectively, in a fluid-tight manner. Since the purpose of the tube 200 is to permit passage of a liquid coolant, the upper and lower ends of the tube communicate with passages 202 and 204 in the upper and lower end members 191 and 193, respectively. As in the previously described rods, these passages communicate with an external surface of the members 191 and 193 so that the liquid coolant in its upward movement between the rod 84 and its surrounding matrix tube 72 is free to enter and leave the coolant tube 200, thereby assuring efficient cooling of the center of the rod 84.

Surrounding the tube 200 is a plurality of sleeves 206 which space a plurality of washers 208 which support the individual bodies 194 of neutron-absorbing material, such as natural uranium, and space them from one another. By virtue of this arrangement clearance is provided between each body 194 and the surrounding members including the jacket 196 on the external surface, the sleeve 206 on the internal surface, and the washer 208 at the top surface, the clearance being necessary for thermal and nuclear growth of each body 194 during its exposure in the reactor 60. The top and bottom end members 191 and 193 of the fast neutron-absorber rod 84 are provided with pinch-off tubes 210 and 212, respectively, together with associated voids in said members so that the void in the rod 84 can be filled with stagnant liquid sodium-potassium alloy, thereby assuring good thermal conductivity between contiguous parts. In order to assure the proper alignment of each rod 84 with its matrix tube 72, each rod is provided with a tapered bottom tip 214 having three ribs 216 adapted for insertion into apertures in a support plate 217 as shown in Fig. 1. Near the top of the rod 84 a three-point guide ring 218 is attached to the upper top member 191 for alignment of the rod at the upper end.

As was pointed out above with regard to Figs. 1 and 2, the slow region 68 is the outer region surrounding the honeycomb regions of matrix tubes 70, 71, and 72, which are designated as core 62, reflector 64, and fast region 66. The slow region 68 consists of the beryllium slabs 88, the slow rods 86, and the liner tubes 87, which contain the slow rods 86 and extend through apertures formed in the slabs 88 and the cover plate 83a. In Figs. 13, 14, and 15, the rod 86 has an elongated appearance similar to the preceding rods, though it has an outside diameter of 1.8 inches. The exterior of the rod 86 is covered by a stainless-steel cylindrical jacket 220, the upper and lower extremities of which are fixed in a liquid-tight manner to top and bottom caps 222 and 224, respectively. Along the central axis of the rod 86 is an elongated 0.5 inch stainless-steel rod 226, the upper end of which is rigidly fixed within the top cap 222 and the lower end of which is slidably disposed within a seat 228 in the bottom cap 224 during thermal expansion. At equally spaced intervals along the rod 226 collars 230 are fixed thereto which provide support for a 0.02 inch thick titanium washer 232. In turn, each washer 232 supports an annular body 234 of neutron-absorbing material, preferably natural uranium, each 4 inches long and 1.762 inches in diameter. Each body 234 occupies all of the allotted space between the washers 232 on one end and within the jacket 220, except for clearance provided between said parts for thermal expansion of the uranium bodies 234. Further expansion is also provided for by the lower end of the rod 226 within the seat 228 in the bottom cap 224. Central alignment of each rod 86 within its liner tube 87 is provided by a vertical tip 236 integral with the bottom cap 224 and by three radial lugs 238 which are integral with the top cap 222. All unoccupied space and clearances within the jacket 220 and between the top and bottom caps 222 and 224 are occupied by stagnant liquid sodium which is sealed therein by means of a pinch-off tube 240 at the top of the top cap 222. The rod 86 used in the outer beryllium matrix or slow neutron-absorber region 68 is termed "slow" rod because of the relatively low isotope production by neutron absorption and the low heat generation rates therein when using natural uranium, as compared to those of the fast neutron-absorber rods 84. Rods 86 are hung so that they extend about 48 inches into the beryllium matrix. The liner tubes 87 have an inner diameter of 2.022 inches and a thickness of 0.01 inch.

Figure 4:
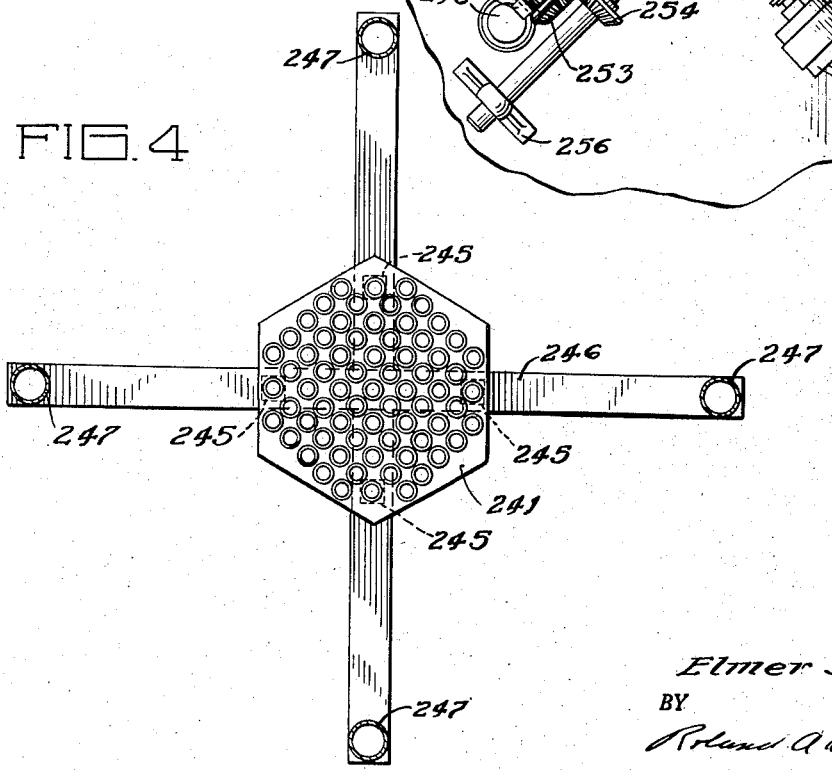
Fig. 4 is a horizontal sectional view taken on the line 4—4 of Fig. 3.

As shown in Figs. 1 and 3, the movable bottom reflector 65 comprises a block of beryllium 241, 3 inches, and a block 242 of neutron-absorbing material, such as natural uranium or thorium ($Th^{232}$), which rest upon a platform 243 made of stainless steel. A plurality of stainless-steel tubes 244 go through the blocks 241 and 242 and are anchored in openings in the platform 243 by being welded or soldered thereto. The tubes 244 hold the blocks 241 and 242 against shifting along the platform 243 and provide passageways for the liquid sodium or sodium-potassium alloy which cools the blocks. There will be about as many coolant tubes 244 as there are fuel rods 80. Each of the blocks 241 and 242 may be formed of a plurality of layers or sheets and has a hexagonal outline, as shown in Fig. 4, in conformance with the outline of the cluster of matrix tubes 70 for the fuel elements 80. Likewise, the support plate 74 and the flange 81 upon which the plate 74 rests have hexagonal outlines.

The platform 243 is carried upon and secured to the upper ends of four posts 245 made of stainless steel. The lower ends of the posts 245 are secured to a stainless-steel spider 246 formed of a plurality of I-beams that, as shown in Figs. 3 and 4, are secured to one another at a common central region and extend radially outward therefrom as four arms spaced about ninety degrees from one another. The ends of the arms of the spider 246 are secured to the lower ends of tubular hangers 247 which extend up through openings formed in the support plates 81a and 217 and in the neutron-moderating blocks 88 at regions thereof well spaced from the cluster of fuel elements 80 and adjacent the periphery of the blocks 88, as shown in Fig. 1. As shown in Fig. 3, the upper ends of the hangers 247 are secured to carriers 248, the ends of which are received in the hangers 247 in threaded connections.

Figure 5:
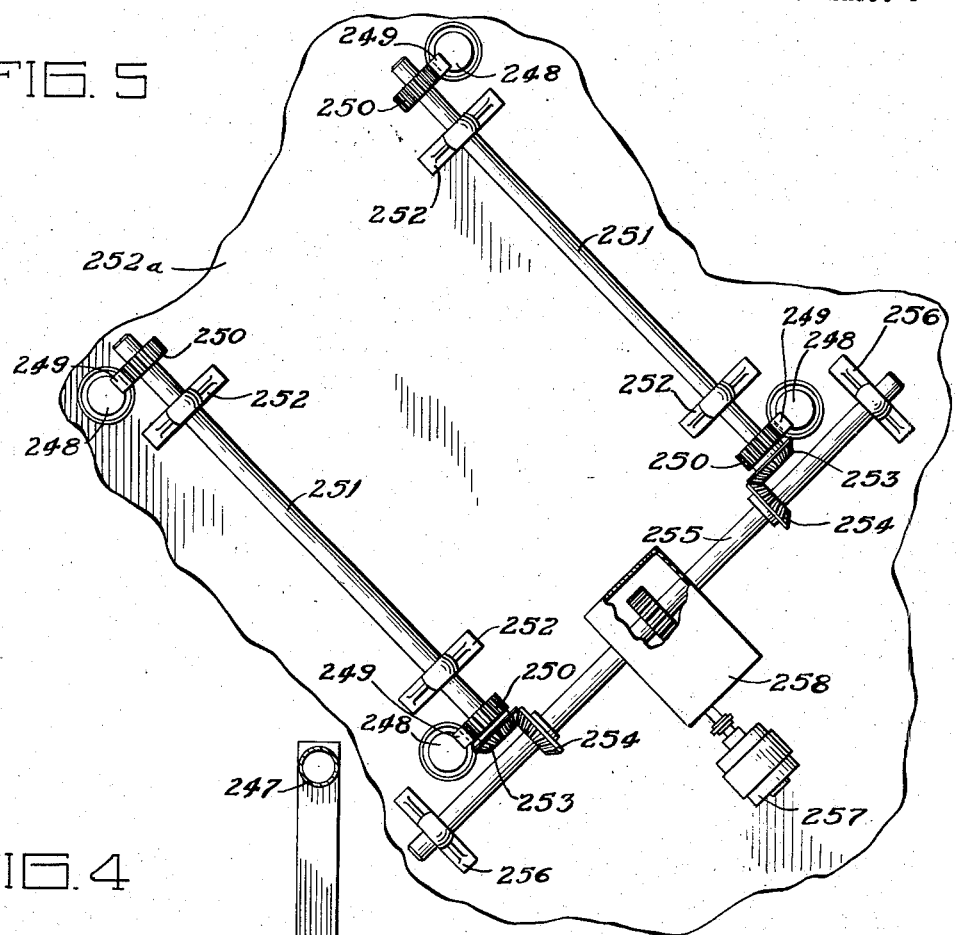
Fig. 5 is a plan view illustrating the driving mechanism by means of which the bottom reflector is moved.

Gear racks 249, set in the carriers 248, mesh with pinions 250, which, as shown in Figs. 3 and 5, are secured to two shafts 251. These shafts are rotatably mounted in bearings 252 which are secured to and supported on a concrete shield 252a provided as part of the cover for the reactor 60. Bevel gears 253, secured to the ends of shafts 251, mesh with bevel gears 254, secured to a shaft 255, journaled in bearings 256, secured to and supported on the shield 252a. The shaft 255 is drivingly connected with a motor 257 through a gear reducer 258. By virtue of the drive arrangement just described, rotation of the motor 257 in one direction causes the hangers 247 to be raised and the bottom reflector 65 to be moved upward toward the fuel elements 80, with the result that the reactivity of the reactor 60 is increased. Rotation of the motor 257 in the opposite direction produces an opposite effect, that is, lowering of the hangers 247, downward movement of the bottom reflector 65 away from the fuel elements 80, and lowering of the reactivity of the reactor.

As has been previously pointed out, the control rods 82 are used to shut down or control the reactor. The control rods are in a region directly surrounding the core 62 and so are subjected to the excessive heat developed therein by the nuclear fission reaction. Possibly distortions will occur that will prevent the necessary movement of the control rods for proper control of the reactor. In this event, the reflector 65 will be moved downward away from the core 62 by the motor 257 acting through the hangers 247. The hangers, being well spaced from the core 62, are not subject to the excessive heat developed in the core, and so distortions are not likely to occur in the hangers or the openings through which they extend, which distortions might cause the hangers to jam in the openings and thus prevent the reflector 65 from being lowered when necessary. Furthermore, any increase in temperature of the hangers 247 due to excessive heat developed in the core 62 would increase the length of the hangers and move the bottom reflector 65 downward away from the core. Thus the reactivity of the core would be decreased with resultant decrease in the development of excessive heat in the core.

It has been previously stated that various portions of the fuel rods, the fast and slow neutron-absorber rods, and the reflectors might be formed of natural uranium or $Th^{232}$. Such materials can be replaced by a neutron-absorbing material that will be converted by neutron absorption to useful isotopes of the same element or another element, such isotopes being stable or radioactive. An example of such substitute material is cobalt, which will be converted to radioactive cobalt. Other examples are cadmium and boron. By the use of $Th^{230}$ instead of natural uranium or $Th^{232}$, there is produced useful $Pa^{231}$.

The relative amounts of materials used in the above reactor, when using natural uranium, are substantially those disclosed below:

TABLE A

*Reactor loading for intermediate neutron flux*

| Region | Constituent | Volume, percent | Atomic Ratio Referred to $U^{235}$ in Core |
|---|---|---|---|
| Core | U(94% $U^{235}$) | 4.177 | 1.00 |
| | Be | 44.13 | 30.6 |
| | Ti | 4.151 | 1.32 |
| | Void | 3.135 | |
| | Na | 33.21 | 4.58 |
| | Stainless Steel | 11.18 | 5.16 |
| Reflector | Be | 70.90 | 65.5 |
| | Na | 20.92 | 3.63 |
| | Stainless Steel | 7.38 | 4.43 |
| | Void | 0.87 | |

| | | | Referred to Natural Uranium |
|---|---|---|---|
| Fast Breeder | U(Natural Uranium) | 49.41 | *1.00 |
| | Be | 7.76 | 0.402 |
| | Void | 1.21 | |
| | Na | 31.77 | 0.315 |
| | Stainless Steel | 9.85 | 0.363 |
| Slow Breeder | U(Natural Uranium) | 38.70 | *1.00 |
| | Be | 41.25 | 2.73 |
| | Void | 0.40 | |
| | Na | 15.45 | 0.200 |
| | Stainless Steel | 4.20 | 0.198 |

*Atomic ratios in blanket normalized to natural uranium rather than core.

TABLE B

*Reactor loading for fast neutron flux*

| Region | Constituent | Volume, Percent | Atomic Ratio Referred to $U^{235}$ in Core |
|---|---|---|---|
| Core | $U^{235}$ | 7.02 | 1.00 |
| | $U^{238}$ | 0.53 | 0.075 |
| | Ti | 8.07 | 1.37 |
| | Stainless Steel | 17.25 | 4.47 |
| | Be | 6.90 | 2.52 |
| | Na | 54.72 | 3.82 |
| | Void | 5.50 | |
| Reflector | Stainless Steel | 7.64 | 2.26 |
| | Be | 67.13 | 27.86 |
| | Na | 24.28 | 1.97 |
| | Void | 0.95 | |

| | | | Referred to Natural Uranium |
|---|---|---|---|
| Fast Breeder | U(Natural Uranium) | 49.41 | 1.00 |
| | Stainless Steel | 9.85 | 0.363 |
| | Be | 7.76 | 0.402 |
| | Na | 31.77 | 0.315 |
| | Void | 1.21 | |
| Slow Breeder | U(Natural Uranium) | 38.70 | 1.00 |
| | Stainless Steel | 4.20 | 0.198 |
| | Be | 41.25 | 2.73 |
| | Na | 15.45 | 0.20 |
| | Void | 0.40 | |

Total mass of $U^{235}$, 114.2 kg.

While the reactor used to illustrate the invention and shown in the figures has a core 62 which is of uniform construction throughout, the invention may be practiced using a core which has a plurality of regions containing different nuclear fuels. For example, the invention may be practiced in a reactor for breeding nuclear fuel constructed by modifying the reactor herein disclosed in the following manner.

The fuel rods 80 disposed in the central region of the core 62 are constructed with $Pu^{239}$ within the fuel elements 115. Also, at least some of the beryllium triangulations between the tubes 70 are removed in order to decrease the moderator to fuel ratio and increase the energy spectrum in this region of the core. The fuel elements 115 in the fuel rods 80 which are disposed in the outer regions of the core 62 are constructed of $U^{233}$. With the core constructed in this manner, the neutron-reflecting region 64 contains control rods 82 having sections 182 containing beryllium. Also the interstices between the tubes 71 are filled with beryllium. The neutron-absorbing region 66 contains fast neutron absorber rods 84 containing uranium or $Th^{232}$, and the neutron-absorbing region 68 contains slow neutron absorber rods containing uranium or $Th^{232}$ or combinations thereof.

A reactor constructed in this manner provides a core having a fast neutron flux in the plutonium portion, thereby reducing the nonfission capture of neutrons in the plutonium. Also, the reactor utilizes a beryllium reflector and achieves the advantages which such a reflector inherently yields. Since the ratio of the nonfission capture cross section to fission cross section of uranium 233 is relatively small for slow neutron spectrums, the core 62 of the reactor will effectively breed in spite of the relatively slow neutron spectrum adjacent to the beryllium reflector.

The intention is to limit the invention only within the scope of the appended claims.

What is claimed is:

1. In a neutronic reactor, the combination comprising a core comprising a substance of the group consisting of $U^{233}$, $U^{235}$, and $Pu^{239}$, a reflector surrounding the sides of the core and comprising a plurality of vertically movable beryllium control members, an absorber of fast neutrons surrounding the reflector and comprising natural uranium, an absorber of slow neutrons surrounding said absorber of fast neutrons and being formed of a plurality of beryllium blocks and a plurality of natural-uranium members distributed therethrough, a movable body positioned directly below the core and comprising a beryllium reflector and an absorbing member attached to the bottom of the reflecting block and containing a substance selected from the group consisting of natural uranium and $Th^{232}$, a plurality of hangers for the body extending in spaced parallel relation to one another through the outer regions of the absorber of slow neutrons and distributed about the core in spaced relation thereto, and means located above the core and acting through the hangers for adjusting the body toward and away from the core.

2. In a neutronic reactor, the combination specified in claim 1 and further comprising cooling means surrounding the absorber of slow neutrons, the hangers passing through this absorber adjacent to the cooling means so as to be cooled thereby.

3. In a neutronic reactor, the combination specified in claim 1, the hangers being four in number, the combination further comprising a spider having its ends connected to the hangers and its middle portion connected with the body.

4. In a neutronic reactor, the combination specified in claim 1 and further comprising a spider having its ends connected to the hangers and upstanding parts supporting the body on the middle portion of the spider.

References Cited in the file of this patent

UNITED STATES PATENTS

| 1,012,246 | Clarke et al. | Dec. 19, 1911 |
| 1,405,301 | De Vol | Jan. 31, 1922 |
| 1,470,581 | Duffy | Oct. 9, 1923 |
| 1,646,984 | Smith | Oct. 25, 1927 |
| 2,708,656 | Fermi et al. | May 17, 1955 |

(Other references on following page)

OTHER REFERENCES

Nucleonics, January 1950, pages 10–14.
AECD–3065, September 19, 1945, declassified February 27, 1951, pages 10–16, 34, 35, 36, 38, 39.
Nucleonics, November 1952, pages 56–60.
Materials Testing Reactor Project Handbook TID–7001, edited by John H. Buck, May 7, 1951. Available from AEC, Technical Information Service, Oak Ridge, Tenn. Pages 45, 63–67, 92–95.
Principles of Nuclear Reactor Eng., by Samuel Glasstone, D. Van Nostrand Co., N. Y. (1955), pp. 812–816.